United States Patent [19]
Powell

[11] Patent Number: 6,095,456
[45] Date of Patent: Aug. 1, 2000

[54] STRUT-WING INTERFACE HAVING DUAL UPPER LINKS

[75] Inventor: Donald T. Powell, Auburn, Wash.

[73] Assignee: The Boeing Company, Seattle, Wash.

[21] Appl. No.: 08/771,007

[22] Filed: Dec. 23, 1996

[51] Int. Cl.[7] .......................... B64D 27/18; B64D 27/12
[52] U.S. Cl. ........................ 244/54; 244/131; 60/39.31; 248/554
[58] Field of Search .................... 244/54, 131; 60/39.31; 248/554

[56] References Cited

U.S. PATENT DOCUMENTS

| | | |
|---|---|---|
| 1,782,013 | 11/1930 | Rohrbach . |
| 2,355,270 | 8/1944 | Frey .............................................. 248/5 |
| 2,539,960 | 1/1951 | Marchant et al. ......................... 60/102 |
| 2,965,338 | 12/1960 | McLean ....................................... 248/5 |
| 3,318,554 | 5/1967 | Ward et al. ................................ 244/54 |
| 4,013,246 | 3/1977 | Nightingale ............................... 244/54 |
| 4,079,981 | 3/1978 | Mahler et al. .............................. 294/81 |
| 4,437,627 | 3/1984 | Moorehead ................................ 244/54 |
| 4,458,863 | 7/1984 | Smith ......................................... 244/54 |
| 4,471,609 | 9/1984 | Porter et al. ............................ 60/39.31 |
| 4,560,122 | 12/1985 | Parkinson et al. ........................ 244/54 |
| 4,917,331 | 4/1990 | Hager et al. ............................... 244/54 |
| 5,181,675 | 1/1993 | Lardellier et al. ......................... 244/54 |
| 5,320,307 | 6/1994 | Spofford et al. .......................... 244/54 |
| 5,409,184 | 4/1995 | Udall et al. ............................... 244/54 |
| 5,467,941 | 11/1995 | Chee ......................................... 244/54 |

FOREIGN PATENT DOCUMENTS 2676707  of 0000  France ......................................... 29/6

*Primary Examiner*—S. Joseph Morano
*Attorney, Agent, or Firm*—Michael S. Smith

[57] ABSTRACT

An improved strut wing interface having dual upper links which lie along parallel planes or in diverging planes. Various design enhancements and capabilities are achieved when using the dual upper links as opposed to a conventional single upper link.

8 Claims, 9 Drawing Sheets

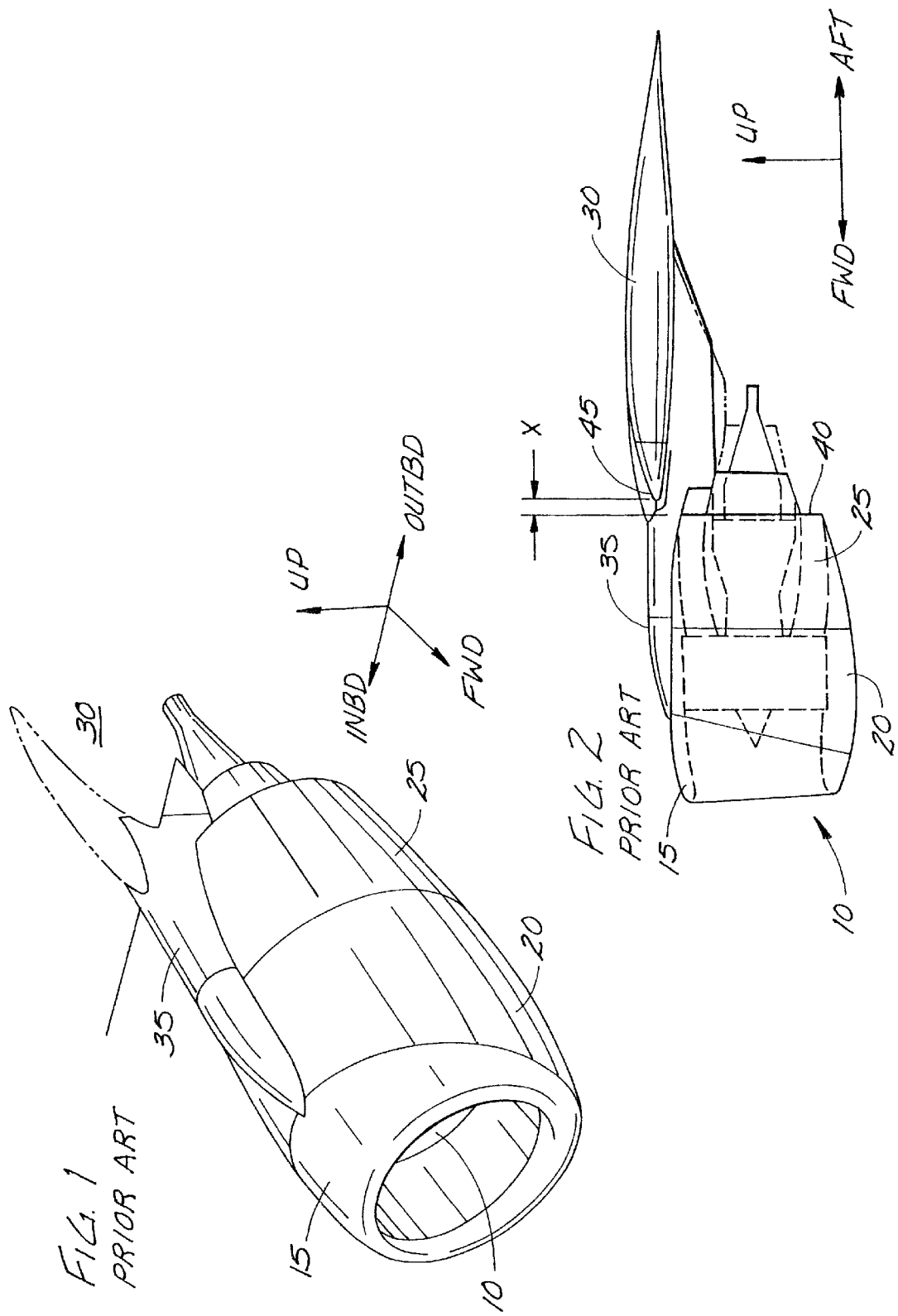

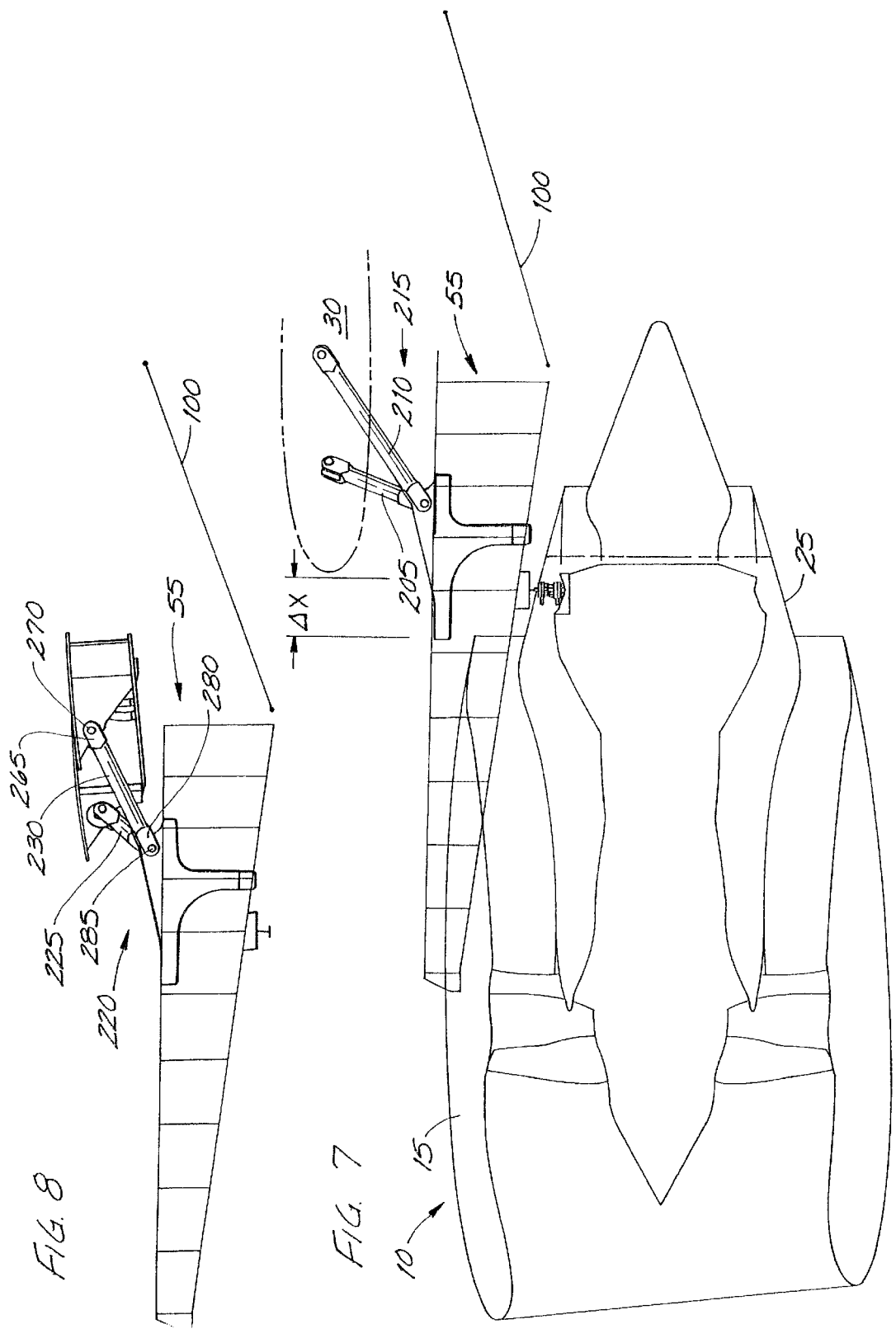

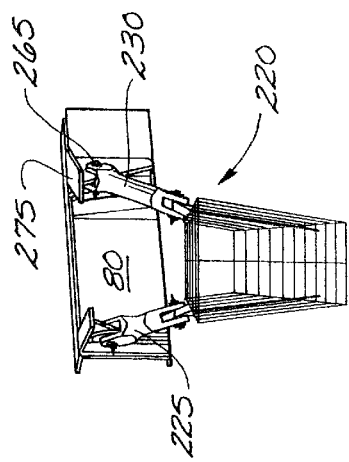
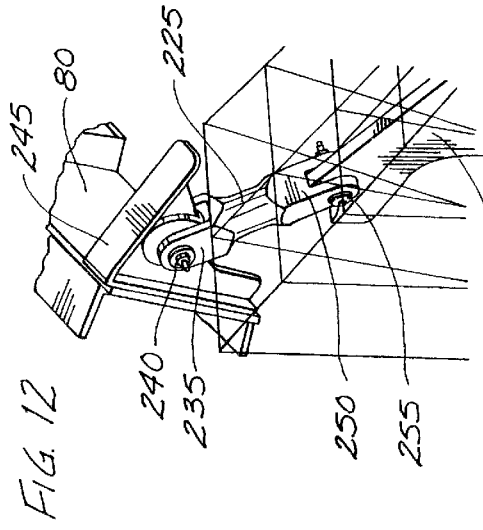
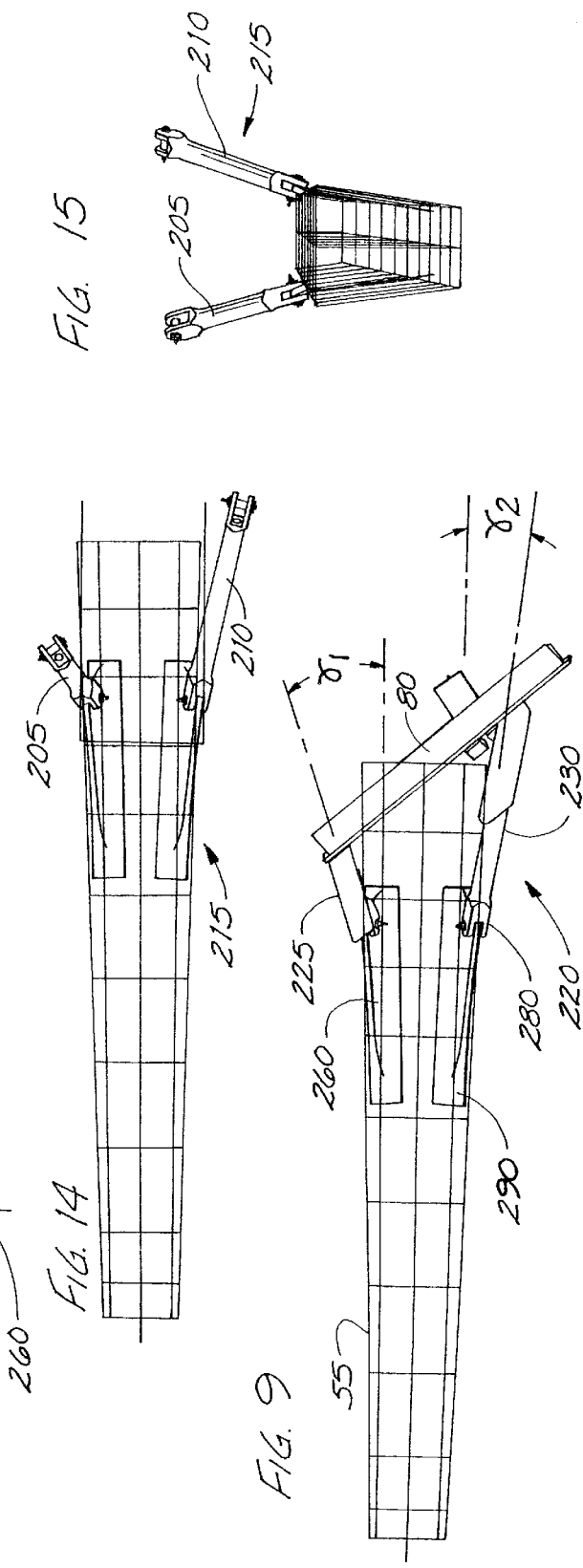

STRUT-WING INTERFACE HAVING DUAL UPPER LINKS

FIELD OF THE INVENTION

This invention relates to an apparatus for carrying an engine generally forward and below the wing of an airplane. More particularly, the present invention relates to a method and an apparatus comprising a strut-wing interface having dual upper links.

BACKGROUND OF THE INVENTION

There are a number of conventional methods and apparatuses for carrying an engine generally forward and below a wing of an airplane. Generally, in a conventional method and apparatus, a strut, attached to the engine, is connected to the wing, i.e., the wing box of an airplane, by means of various structural elements or interfaces which usually comprise one upper link, one diagonal brace, two side links and two midspar fittings or two upper spar fittings. Examples include U.S. Pat. No. 5,467,941, issued Nov. 21, 1995, to Chee, U.S. Pat. No. 5,181,675, issued Jan. 26, 1993, to Lardellier etal., U.S. Pat. No. 4,917,331, issued Apr. 17, 1990, to Hager etal., U.S. Pat. No. 4,560,122, issued Dec. 24, 1985, to Parkinson etal., U.S. Pat. No. 4,458,863, issued Jul. 10, 1984, to Smith, U.S. Pat. No. 4,437,627, issued Mar. 20, 1984, to Moorehead, and U.S. Pat. No. 4,079,981, issued Mar. 21, 1978, to Mahler et al.

However, in general, but more particularly in the case of new huge commercial transports now being contemplated, a number of new challenges must be met by airplane manufacturers. In particular, in some cases the wing-strut strength requirements may be at the maximum level the manufacturer would like to see. Thus, manufacturers have new primary objectives in designing strut-wing interface structures. For example, there is a desire to reduce strength requirements at the strut-wing interface. Also, it is highly desirable to improve the flutter/dynamic aspects in single-element configurations. As used herein, "single-element" means that the structure can withstand the total or partial failure of any one element of the engine/strut/wing attachment arrangement. In addition, aerodynamicists are insisting that aerostructural engineers reduce interface pin spacing, i.e., narrow the strut box width, to reduce drag and locate placement of the engine/nacelle/strut package (nacelle package) to minimize engine nacelle drag and optimize engine performance. The nacelle position is critical to performance of the airplane, and the nacelle package is typically placed as far forward of the wing as possible. As will be apparent to one of ordinary skill in the art, this last requirement imposes increased strength requirements on the strut-wing interface ordinarily resulting in heavier structures.

SUMMARY OF THE INVENTION

An object of this invention is to provide an improved strut wing interface.

Another object of this invention is to provide an improved strut wing interface which meets all of the objectives described above.

These and other objects of the present invention are achieved through the simple, but unobvious, attachment of dual upper links to the strut box of a conventional strut wing interface.

BRIEF DESCRIPTION OF THE DRAWINGS

The foregoing and other features and advantages of the present invention will become more readily appreciated by reference to the following detailed description of an embodiment of the invention and the accompanying drawings wherein like numbers refer to the same or similar parts and wherein:

FIG. 1 shows a conventional engine suspended generally forward and belw a wing of an airplane.

FIG. 2 is a side view, looking inboard, of the engine of FIG. 1.

FIG. 7 is a simplified side sectional view of a conventional engine suspended generally forward and below a wing of an airplane by the dual-upper-link strut-wing interface of the present invention.

FIG. 8 is a simplified side sectional view, with parts broken away, of the outboard strut wing interface of the present invention.

FIG. 9 is a simplified top view of the outboard strut-wing interface of FIG. 8.

FIG. 10 is a simplified view looking aft toward the wing of the strut wing interface of FIG. 8.

FIG. 12 is a simplified isometric view, looking outboard, of the strut attachment point to the outboard strut-wing interface of FIG. 8.

FIG. 13 is a simplified isometric view, looking inboard, of the strut attachment point to the outboard strut-wing interface of FIG. 8.

FIG. 14 is a simplified top view of the inboard strut-wing interface.

FIG. 15 is a simplified view, looking aft toward the wing, of the inboard strut wing interface of FIG. 14.

DESCRIPTION OF A PREFERRED EMBODIMENT

Figure 3:
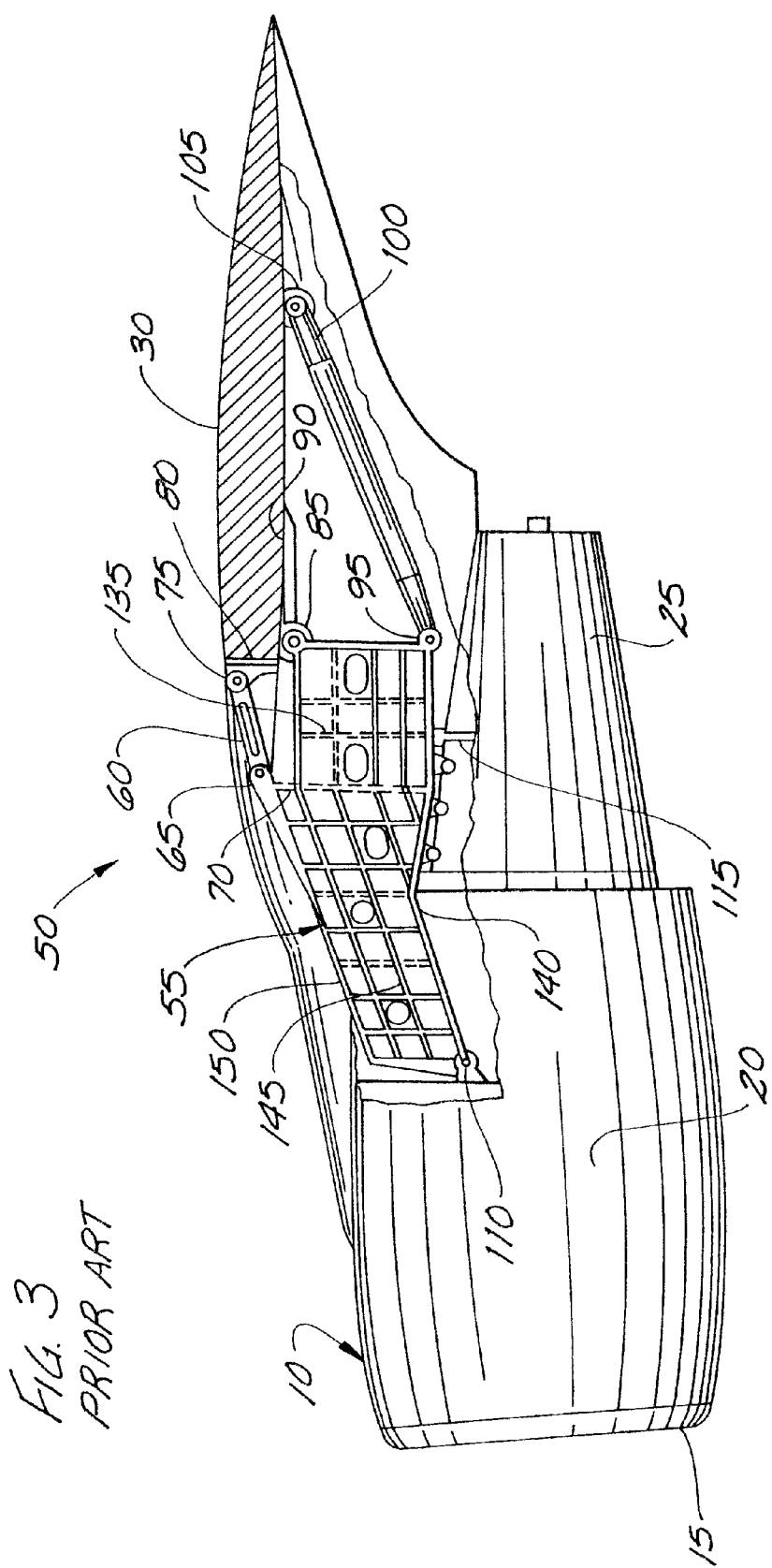
FIG. 3 is a side view, with parts broken away, showing a conventional strut-wing interface for attaching an engine to an airplane wing.

Referring first to FIG. 1, there is shown a conventional engine 10 comprising an inlet 15, an engine nacelle 20 and a fan exhaust/reverser 25. The engine 10 is attached to the wing 30 of an airplane (not shown) by means of a conventional strut wing interface (not shown in FIGS. 1 and 2). Aerodynamic fairing skin 35 cover the conventional strut wing interface discussed below. As perhaps better shown in FIG. 2, the engine 10 is disposed forward and below the wing of the airplane. In the conventional interface of FIGS. 1 and 2, a station defined at the engine fan exit plane 40 is positioned forward of a plane defining the leading edge 45 of the wing 30 by a certain amount (x) which is a trade between weight/cost/performance.

Figure 4:
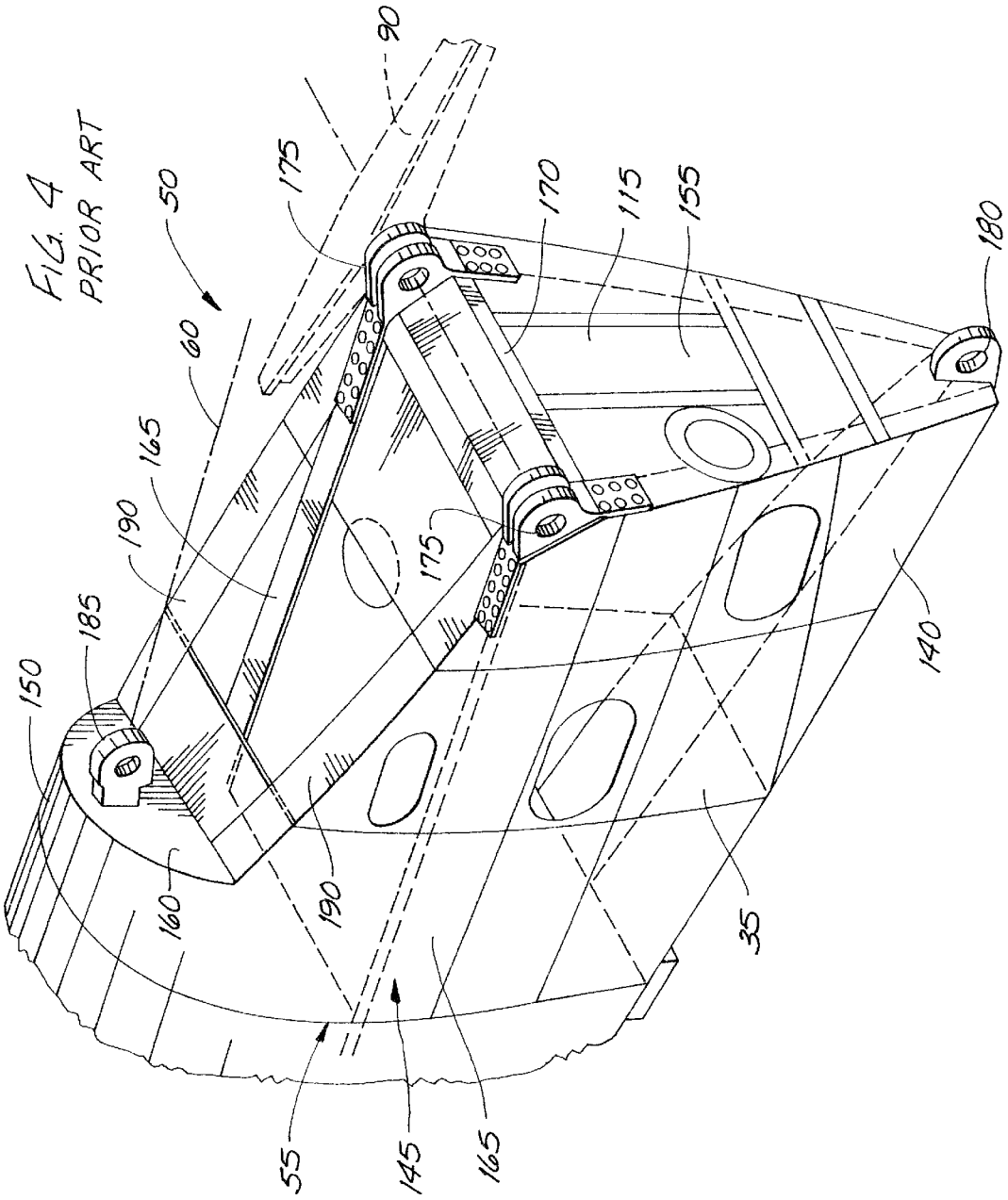
FIG. 4 is a partial isometric view of a portion of the conventional strut shown in FIG. 3.
Figure 5:
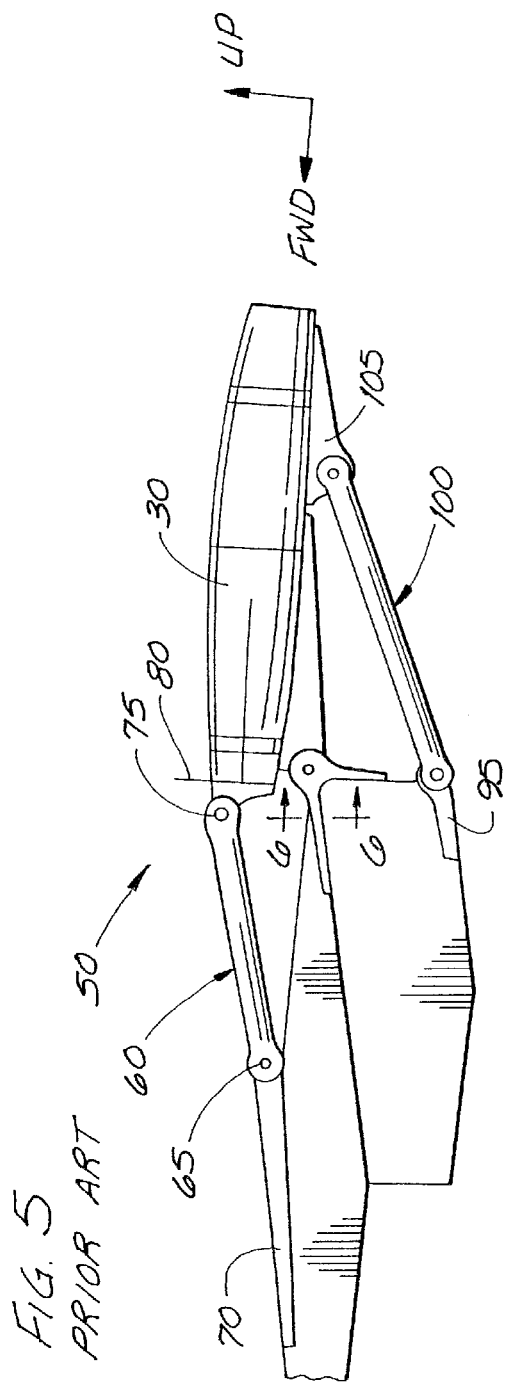
FIG. 5 is a simplified side view of the strut-wing interface of FIG. 3.

Referring now to FIGS. 3 and 5, there is shown a conventional method of attaching an engine 10 to a wing 30, i.e., a conventional strut wing interface indicated generally at 50. As shown in FIG. 4, the strut wing interface 50 comprises a strut box 55 which has a somewhat trapezoidal cross-sectional configuration. The strut box 55 (FIG. 3) is connected to the wing 30 by a single rearward extending upper link 60 which has a forward end connected by a connector 65 to an upper portion 70 of the strut box 55, and a rear end connected by a connector 75 to a spar 80 comprising the wing box of the wing 30. To further connect the strut box 55 to the wing 30 there is provided a pair of connectors 85 (only one of which is shown in FIG. 3, but see FIG. 6) which are located at the upper rear end of the strut box 55 and which attach to a fitting 90 affixed to the wing 30. In addition, the lower rear end of the strut box 55 is attached to the wing 30 by a connector 95 which is attached to an upward and rearward extending diagonal brace 100; the other end of the brace 100 being attached to a wing fitting 105. Furthermore, the engine nacelle 20 is connected to the strut box 55 in a conventional manner by means of a forward mount 110 and an aft mount 115. While not shown in FIG. 3 (but see FIG. 6), a pair of side links 120 are coupled at their upper end to a wing fitting 125 and at their lower end to connectors 85. The wing fitting 125 is centered on the centerline 130 of the engine 10.

The strut box 55 (FIGS. 3 and 4) is an example of a conventional strut box and is shown as being formed by a number of vertical, spanwise bulkheads which are joined at their lower ends by a fore and aft extending lower spar 140, at their midsections by a midspar 145, and at their upper ends by an crown stringer 150. A number of the rear bulkheads are shorter in height than the forward bulkheads. These shorter bulkheads include a rearmost bulkhead 155, while the taller forward bulkheads include a rearmost bulkhead 160.

Figure 6:
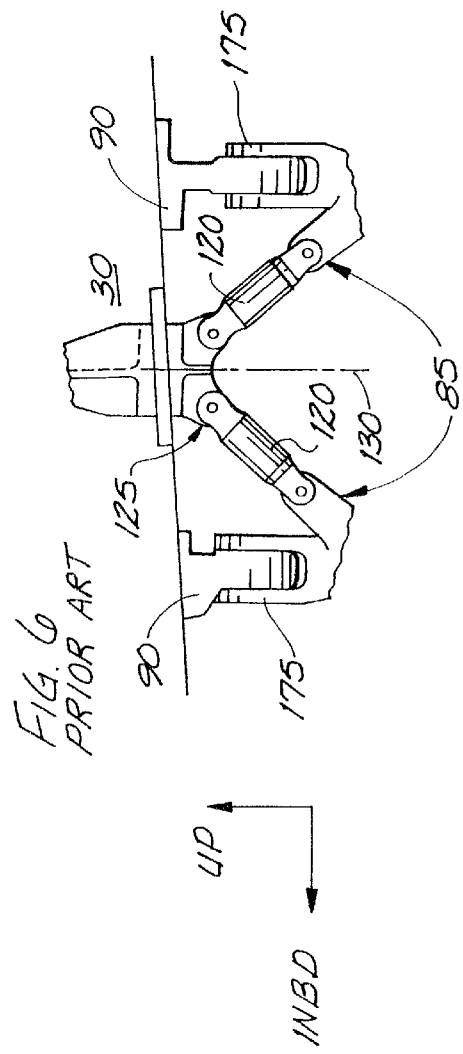
FIG. 6 is a simplified view of the strut-wing interface of FIG. 5, looking aft toward the wing, taken along lines 6—6 in FIG. 5.
Figure 11:
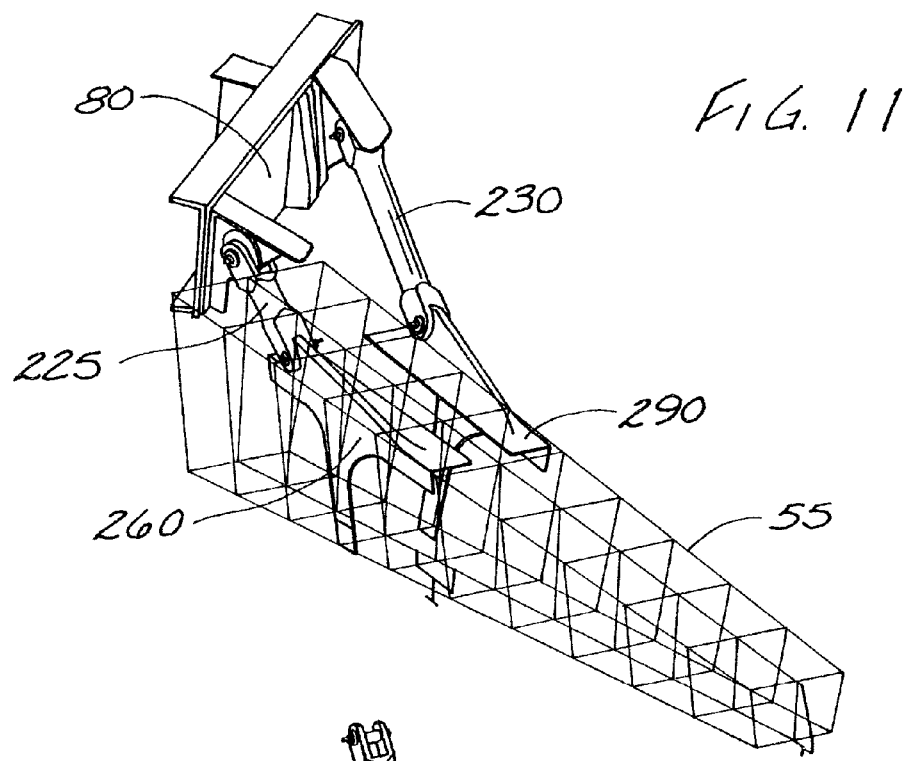
FIG. 11 is a partial isometric view of the improved strut-wing interface of FIG. 8.
Figure 16:
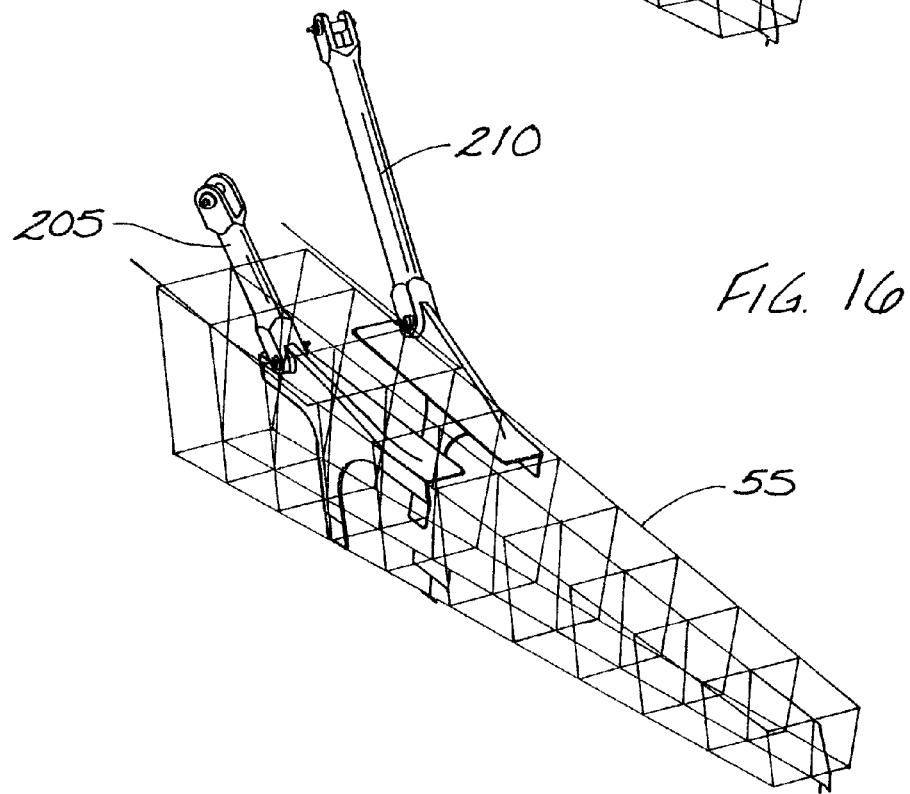
FIG. 16 is a partial isometric view of the improved strut-wing interface of FIG. 14.

Referring now to FIGS. 4, 5 and 6, a portion of the conventional strut box 55 is shown extending from just forward of the bulkhead 160 in a rearward direction and terminating at the bulkhead 155. In this manner there is shown the portion of the strut box 55 which is connected to the wing 30. The midspar 145 is formed by a pair of fore and aft extending beams 165 which are joined together at the bulkhead 155 by a crossbeam 170. Attached to the aft end of each beam 165 at the crossbeam 170 is a female portion (mid-spar fittings) 175 of the connector 85 which is attached to the male portion of the fitting 90 which is in turn mounted to the wing 30. The male and female connector portions are held together by a lateral pin (not shown) which extends through openings in the male and female portions.

In order to connect the strut box 55 to the brace 100 (FIGS. 3–5), a male portion 180 of the connector 95 is mounted to the aft end of the lower spar 140. In addition, a male portion 185 of the connector 65 is attached to the aft end of the crown stringer 150 to further secure the strut box 55 to thy wing 30. The strut box 55 is further formed by a closure spar which includes a pair of beams 190 which extend downward and rearward from the bulkhead 160 and which are connected to the aft end of the midspar 145. The fairing skin 35 encloses the strut wing interface 50 for aerodynamic smoothness.

The conventional strut wing interface 50 is acceptable as long as the strength requirements imposed on the interface are not too high. However, as the size of airplanes increase and other structural and aerodynamic requirements change, the strength requirements experienced with the conventional interface 50 may force the location of the nacelle package to be in positions which are structurally driven and not peformance driven. Hence, there is a need for alternative methods and apparatus for attaching engines to wings.

More particularly, there is a need to reduce the strength requirements at the strut wing interface. The flutter/dynamic aspects in fail-safe configurations should preferably be improved. As a means of reducing drag, the strut box should preferably be narrowed. Finally, the engine nacelle position should preferably be positioned by performance considerations e.g., the reduction of nacelle drag and the minimization of engine thrust requirements.

The dual upper links used in the present invention addresses all of the above concerns. For example, the present strut wing interface having dual upper links allow for optimum placement of an engine 10 for airplane drag/engine thrust performance improvement purposes, as is shown in FIG. 7.

The dual upper link configuration of the present invention is a very stable system for single element failures resulting in a 40% reduction in the required joint strength for either a midspar 145 or an upperspar 150, and a 30% decrease in the joint strength requirements for the diagonal brace 100. This results in a reduction in total strength requirements and a significant reduction for specific elements of the present interface as compared to a conventional strut wing interface 50. Factors affecting joint strength requirements include flutter, dynamic loads, and strength requirements.

The conventional strut wing interface 50 is "tunable" in one mode, in terms of the natural frequency of the engine/strut box/nacelle package. As used herein "tunable" means the capability of changing this natural frequency without great increases in cost. For the conventional strut wing interface 50, this is accomplished by simply changing the cross-sectional areas of the upper link 60 and the diagonal brace 100. Currently, the single upper link 60 and diagonal brace 100 are tunable only in the vertical mode. In contrast, the present strut wing interface having dual upper links is tunable in the first three primary modes (lateral, vertical and torsional).

In general, the desired directions for "tuning" the engine/strut box/nacelle package are the lateral and vertical modes of the natural frequencies of the package. The dual upper links of the present invention allow for tuning the lateral, vertical, and torsional modes of the package by simply changing the cross-sectional areas of the dual upper links and the diagonal brace 100.

More particularly, with reference to the simplified view of FIG. 7 there is shown an improved strut wing interface comprising a pair of (dual) upper links 205 and 210 (a inboard dual link interface assembly 215 is shown in FIGS. 7 and 14–16 and an outboard dual link interface assembly 220 is shown in FIGS. 8–13). FIG. 7 is intended to indicate that the engine 10 may be positioned further forward than is permitted with the conventional strut wing interface 50 resulting in a reduction in airplane drag and an improvement in engine thrust. All other interfaces, described above in connection with the conventional strut wing interface 50 remain, although the structural requirements imposed on each structural element are reduced, as described above.

Figure 17:
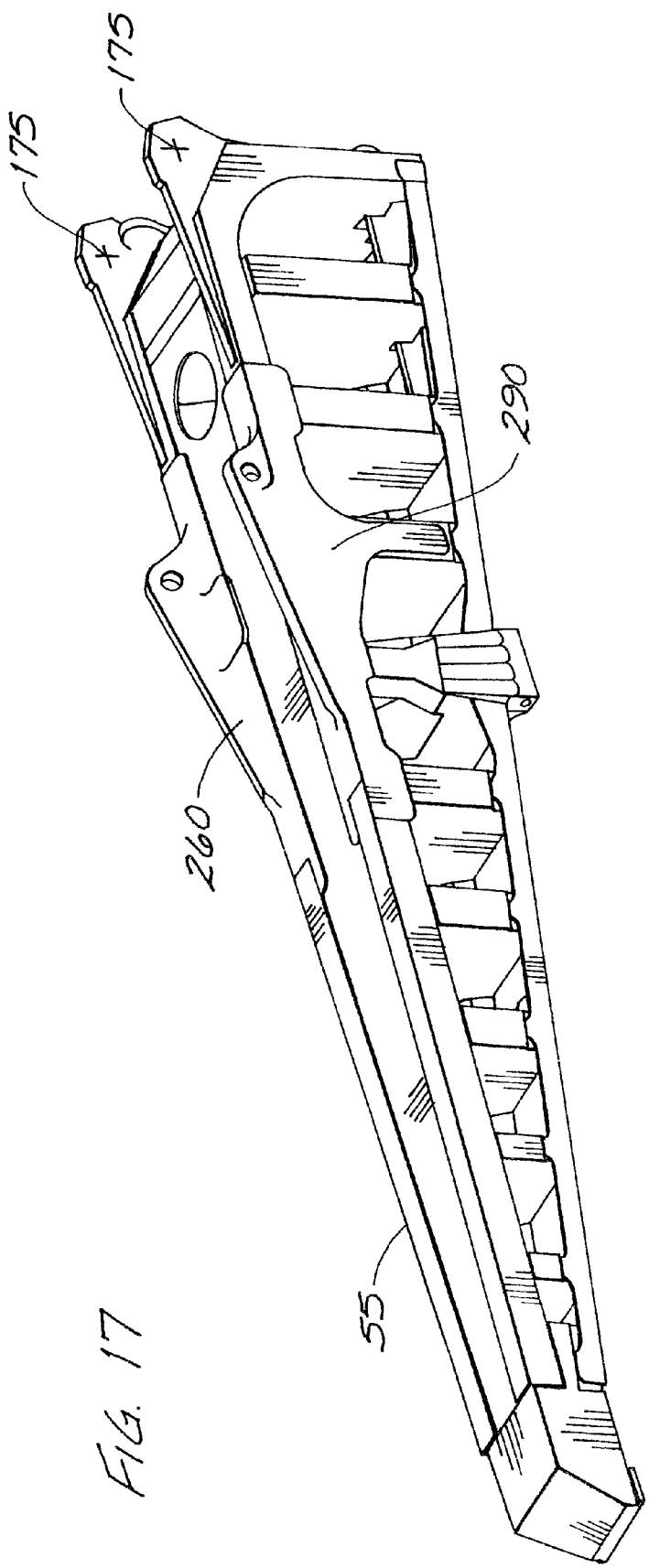
FIG. 17 shows an isometric view of the strut box used in the improved strut wing interface of the present invention

FIGS. 8–13 illustrate various views of the outboard strut wing interface assembly 220 of the present invention. More particularly, the present outboard strut wing interface assembly 220 comprises a first (inboard) dual upper link 225 and a second (outboard) dual upper link 230. The upper aft end of the first dual upper link 225 comprises a female portion 235 pinned at 240 to an inboard fitting 245 affixed to the front wing spar 80 of the wing 30 (see FIGS. 12 and 13). The lower forward end of the first dual upper link 225 also comprises a female portion 250 pinned at 255 to an inboard strut box fitting 260 (see, e.g., FIGS. 9–13, and 17). The upper aft end of the second dual upper link 230 comprises a female portion 265 pinned as at 270 to an outboard fitting 275 affixed to the front wing spar 80 of the wing 30 (see FIGS. 9, 10 and 11). The lower forward end of the second dual upper link 230 also comprises a female portion 280 pinned at 285 to an outboard strut box fitting 290 (see, e.g., FIGS. 8, 9 and 11). Obviously, the male and female portions of the above structural elements or interfaces can be reversed or some mixture thereof may be used. See FIG. 17 for an additional view of the strut box 55 which has been slightly modified in the present invention from a conventional strut box to provide the additional fittings each of which are affixed or integral with the strut box.

The inboard dual upper link assembly 215 is likewise attached to the strut box 55 and the forward spar 80 of the wing 30. However, as will be obvious to those skilled in the art, the lengths of the first and second dual links 205, 210, of the inboard dual upper link assembly are longer in length than the first and the second dual upper links 225, 230 of the outboard dual upper link assembly 220 to accommodate the sweep of the wing 30 and depth of the forward spar 80.

An important feature of the present invention is the dual upper link/strut box interface. More specifically, the two upper links of the inboard dual upper link assembly and the outboard dual upper link assembly should have an optimized amount of "toe in" at the strut box 55 and "toe out" at the front spar 80. "Toe in" means, e.g., that the first and the second dual upper links should be attached to the strut box 55 proximate the edge of the strut box 55 whereby loads may be transferred to the side skins (not shown) of the strut box 55. As for "toe out", the angles $\gamma_1$ and $\gamma_2$, i.e., the angles defined by a fore/aft plane extending parallel to the centerline plane of the strut box 55 and a plane extending through the centerlines of the first and the second dual upper links X, X, respectively, are selected for optimal aerodynamic performance. Both $\gamma_1$ and $\gamma_2$ can equal zero, i.e., the first and the second dual upper links 225, 230 can extend aft in parallel planes. However, the preferred configuration provides both positive toe in and toe out. As should be obvious to the skilled artisan, excessive toe in/toe out defeats the purpose of an additional upper link.

The primary advantage of having toe in and toe out is to relieve strength requirements of the side link interface 120. When side forces are subjected to the engine/nacelle/strut system both side links 120 are put into compression in a dual upper link configuration of the present invention making the side links 120 an inefficient load path for reacting side loads and the resulting strength requirements for the sidelinks 120 become excessive.

For the dual upper links of the present invention, with toe in and toe out, the optimum location for reacting these side loads is now located at the dual upper link interface. The engine/nacelle/strut system, when subjected to side forces, results in compression in one upper link 120 and tension in the other link 120. Hence, the upper links 120 "help" each other to react side forces.

The dual upper links of the present invention should preferably be affixed to the strut box 55 as far forward as possible. An optimum location may be the aft engine mount station. However, the actual location of this point of attachment is dependent upon a trade study between performance versus weight penalties. Moving the point of attachment further forward increases drag because of the associated fairing. Moving it further aft increases weight.

Figure 18:
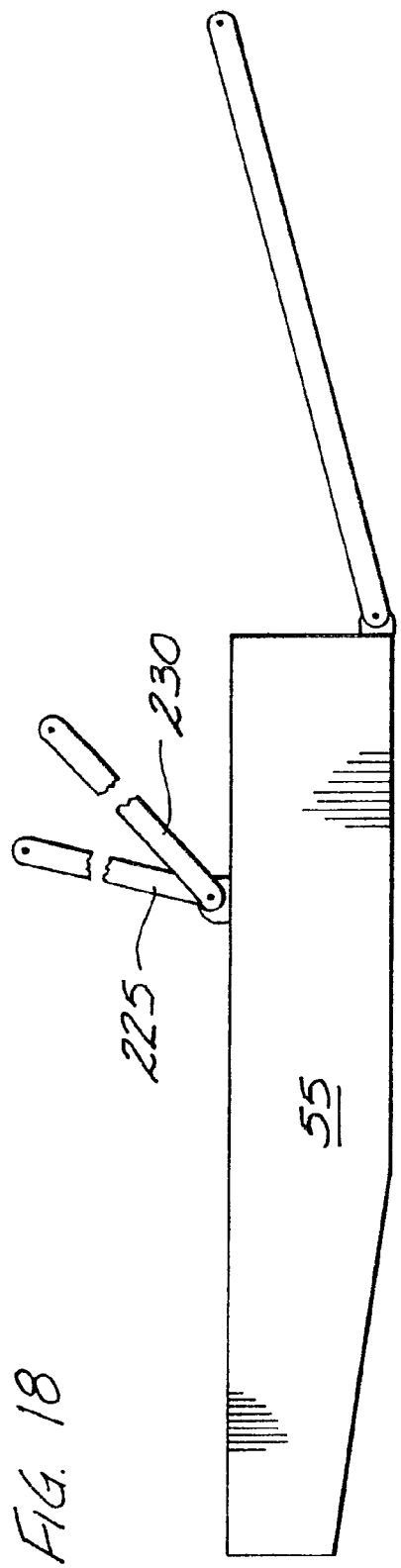
FIG. 18 is a simplified side view of a first configuration of common struts, dual upper links.
Figure 19:
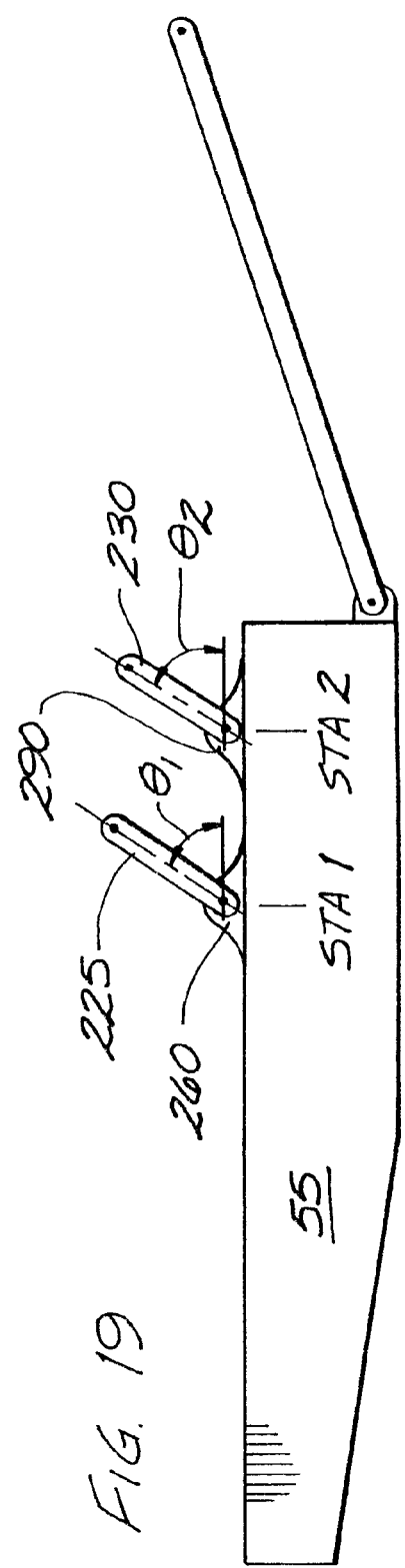
FIG. 19 shows a simplified side view of a second configuration of handed struts, dual upper links.

For an airplane that uses multiple nacelle packages, the dual link configuration of the present invention can either be common or handed (unique). See FIGS. 18 and 19. In other words, the location of the strut box fittings 260, 290 can either lie along the same axis (FIG. 18) or positioned uniquely along different axes and at different angles $\theta_1$, $\theta_2$, relative to the strut box 55 (FIG. 19). Again, the selection of either a common or a handed configuration must be made after a conventional cost/weight/drag/aesthetics trade study.

Thus, as should be obvious to those skilled in the art, the basic changes of the present strut wing interface having dual upper links provide a number of advantages. For example, the present invention allows for optimum placement of the engine for performance purposes. Secondly, the total strength requirements of the present strut wing interface with dual upper links is less than the conventional interface. Third, there are significant strength requirement reductions for specific elements of the present interface with dual upper links (two midspar or upper spar fittings and a diagonal brace) when compared to the conventional strut wing interface requirements. Fourth, the conventional interface is tunable only in the vertical mode for the nacelle package. The dual upper link configuration allows tuning for the first three primary modes of the nacelle package. Finally, there are several ways to install the dual upper links allowing for optimization between performance/weight/cost.

As will be obvious to the skilled artisan, the removal of the single upper link and the addition of two upper links increases the redundancy of the present interface from 8 to 9. Normally, extra redundancy on this order is not preferred in the art due to a perceived increase in analytical and installation complexity.

While the principles of this invention have been described in connection with specific embodiments, it should be understood clearly that these descriptions are made only by way of example and are not intended to limit the scope of the invention.

What is claimed and desired to be secured by Letters Patent of the United States is:

1. An apparatus for attaching an engine to the wing of an airplane having a leading edge and a trailing edge, said apparatus, comprising:

(a) a wing box;

(b) an elongated strut box disposable below said wing and forward of said leading edge, said strut box comprising a first lateral side, a second lateral side spaced apart from said first lateral side, an upper portion connecting said first lateral side to said second lateral side, a lower portion connecting said first lateral side to said second lateral side, and a rearmost bulkhead connected to said first lateral side, said second lateral side, said upper portion and said lower portion, said strut box having a longitudinal axis and a substantially trapezoidal cross section;

(c) a first structural fitting attached to said upper portion where said first side is connected to said upper portion and a second structural fitting attached to said upper portion where said second side is connected to said upper portion, said first structural strut box fitting and said second structural strut box fitting lying along a plane that is transverse to said longitudinal axis, said transverse plane being positioned proximate to, but spaced away from, said rearmost bulkhead;

(d) an elongated brace pinned at one end to said strut box where said lower portion is connected to said bulkhead, said elongated brace being pinned at another end to a first wing fitting, attached to said wing box, which is disposed aft of said leading edge towards said trailing edge, said brace extending upwardly away from said strut box and towards the trailing edge of said wing;

(e) a pair of diagonal side links having two ends, one of said ends of each of said side links being attached to said rearmost bulkhead, the other of said ends of each of said side links being attached to a second wing box fitting attached to said wing box proximate said leading edge, said second wing box fitting being disposed along a plane passing through the longitudinal centerline of said engine, and (f) first and a second elongated upper link, said first and said second upper links being on opposite sides of a longitudinal plane passing through said longitudinal axis of said strut box, each of said upper links having a first end and a second end, said first end of said first upper link being pinned to said first structural strut box fitting and its second end being pinned to a third wing box fitting attached to said wing box, said first end of said second upper link being pinned to said second structural strut box fitting and its second end being pinned to a fourth wing box fitting attached to said wing box, said third wing box fitting being spaced apart from said fourth wing box fitting, whereby optimum placement of said engine for aerodynamic performance purposes may be effected and strength requirements for attaching said engine to said wing may be reduced.

2. The apparatus of claim 1, wherein the length of said first upper link is not equal to said second upper link, whereby the shape of said wing may be accommodated.

3. The apparatus of claim 2, further comprising a first plane passing through the centerline of said first upper link and a second plane passing through the centerline of said second upper link, said first upper link plane forming a first angle with respect to said strut box longitudinal plane, said second upper link plane forming a second angle with respect to said strut box longitudinal plane, said first angle being equal to or greater than said second angle.

4. The apparatus of claim 1, further comprising a first plane passing through the centerline of said first upper link and a second plane passing through the centerline of said second upper link, said first upper link plane forming a first angle with respect to said strut box longitudinal plane, said second upper link plane forming a second angle with respect to said strut box longitudinal plane, said first angle being equal to or greater than said second angle.

5. An apparatus for attaching an engine to the wing of an airplane having a leading edge and a trailing edge, said apparatus, comprising:

(a) a wing box;

(b) an elongated strut box disposable below said wing and forward of said leading edge, said strut box comprising a first lateral side, a second lateral side spaced apart from said first lateral side, an upper portion connecting said first lateral side to said second lateral side, a lower portion connecting said first lateral side to said second lateral side, and a rearmost bulkhead connected to said first lateral side, said second lateral side, said upper portion and said lower portion, said strut box having a longitudinal axis and a substantially trapezoidal cross section;

(c) a first structural fitting attached to said upper portion where said first side is connected to said upper portion and a second structural fitting attached to said upper portion where said second side is connected to said upper portion, said first structural strut box fitting and said second structural strut box fitting lie on opposite sides of a plane that is transverse to said longitudinal axis, said transverse plane being positioned proximate to, but spaced away from, said rearmost bulkhead;

(d) an elongated brace pinned at one end to said strut box where said lower portion is connected to said bulkhead, said elongated brace being pinned at another end to a first wing fitting, attached to said wing box, which is disposed aft of said leading edge towards said trailing edge, said brace extending upwardly away from said strut box and towards the trailing edge of said wing;

(e) a pair of diagonal side links having two ends, one of said ends of each of said side links being attached to said rearmost bulkhead, the other of said ends of each of said side links being attached to a second wing box fitting attached to said wing box proximate said leading edge, said second wing box fitting being disposed along a plane passing through the longitudinal centerline of said engine, and (f) a first and a second elongated upper link, said first and said second upper links being on opposite sides of a longitudinal plane passing through said longitudinal axis of said strut box, each of said upper links having a first end and a second end, said first end of said first upper link being pinned to said first structural strut box fitting and its second end being pinned to a third wing box fitting attached to said wing box, said first end of said second upper link being pinned to said second structural strut box fitting and its second end being pinned to a fourth wing box fitting attached to said wing box, said third wing box fitting being spaced apart from said fourth wing box fitting, whereby optimum placement of said engine for aerodynamic performance purposes may be effected and strength requirements for attaching said engine to said wing may be reduced.

6. The apparatus of claim 5, wherein the length of said first upper link is not equal to said second upper link, whereby the shape of said wing may be accommodated.

7. The apparatus of claim 6, further comprising a first plane passing through the centerline of said first upper link and a second plane passing through the centerline of said second upper link, said first upper link plane forming a first angle with respect to said strut box longitudinal plane, said second upper link plane forming a second angle with respect to said strut box longitudinal plane, said first angle being equal or greater than said second angle.

8. The apparatus of claim 5, further comprising a first plane passing through the centerline of said first upper link and a second plane passing through the centerline of said second upper link, said first upper link plane forming a first angle with respect to said strut box longitudinal plane, said second upper link plane forming a second angle with respect to said strut box longitudinal plane, said first angle being equal or greater than said second angle.

* * * * *